(12) United States Patent
Zang et al.

(10) Patent No.: US 12,469,928 B2
(45) Date of Patent: Nov. 11, 2025

(54) SAFE LITHIUM-ION BATTERY (LIB) SEPARATOR, FABRICATION METHOD THEREOF, AND LIB

(71) Applicant: CHONGQING JIMAT NEW MATERIAL TECHNOLOGY CO., LTD., Chongqing (CN)

(72) Inventors: Shiwei Zang, Chongqing (CN); Wenqing Liu, Chongqing (CN)

(73) Assignee: CHONGQING JIMAT NEW MATERIAL TECHNOLOGY CO., LTD., Chongqing (CN)

( * ) Notice: Subject to any disclaimer, the term of this patent is extended or adjusted under 35 U.S.C. 154(b) by 780 days.

(21) Appl. No.: 17/766,223

(22) PCT Filed: Jun. 10, 2021

(86) PCT No.: PCT/CN2021/099441
§ 371 (c)(1),
(2) Date: Apr. 2, 2022

(87) PCT Pub. No.: WO2022/121265
PCT Pub. Date: Jun. 16, 2022

(65) Prior Publication Data
US 2023/0198093 A1  Jun. 22, 2023

(30) Foreign Application Priority Data
Dec. 11, 2020  (CN) .......................... 202011463207.4

(51) Int. Cl.
*H01M 50/40*  (2021.01)
*H01M 10/0525*  (2010.01)
(Continued)

(52) U.S. Cl.
CPC ..... *H01M 50/403* (2021.01); *H01M 10/0525* (2013.01); *H01M 50/446* (2021.01); *H01M 50/449* (2021.01)

(58) Field of Classification Search
None
See application file for complete search history.

(56) References Cited

U.S. PATENT DOCUMENTS

| | | | |
|---|---|---|---|
| 8,470,898 B2 | 6/2013 | Huang et al. | |
| 2014/0186679 A1* | 7/2014 | Archer | H01M 50/443 525/333.9 |

(Continued)

FOREIGN PATENT DOCUMENTS

| CN | 104157811 A | 11/2014 |
|---|---|---|
| CN | 205194767 U | 4/2016 |

(Continued)

OTHER PUBLICATIONS

Machine translation of CN 106953050 A.*
Machine translation of CN 111875837 A.*

*Primary Examiner* — Jonathan G Leong
*Assistant Examiner* — Tony S Chuo
(74) *Attorney, Agent, or Firm* — The Sun IP Law

(57) ABSTRACT

A safe lithium-ion battery (LIB) separator, a fabrication method thereof, and an LIB are provided. The fabrication method includes: S1: preparation of a water-based slurry: mixing a ceramic material, magnesium oxide, conductive carbon black (CB), and a water-based adhesive, and thoroughly stirring to obtain the water-based slurry; S2: fabrication of a first film: adding trans-1,4-polyisoprene, cis-polybutadiene rubber (cis-BR), conductive CB, and a water-soluble salt to a compounding granulator for compounding to prepare a memory material; adding the memory material to a mixed solution of aluminum nitride and ethanol, and conducting stirring, suction filtration, drying and calcination (Continued)

to obtain a solid material; and mixing a high-polymer particle with the solid material, adding a resulting mixed material to a film-blowing machine, blowing into a film, and watering and drying the film to obtain the first film; S3: fabrication of a second film; and S4: fabrication of the LIB separator.

19 Claims, 2 Drawing Sheets

(51) Int. Cl.
*H01M 50/403* (2021.01)
*H01M 50/446* (2021.01)
*H01M 50/449* (2021.01)

(56) References Cited

U.S. PATENT DOCUMENTS

| | | | |
|---|---|---|---|
| 2019/0148698 A1 | 5/2019 | Kwon et al. | |
| 2020/0350546 A1* | 11/2020 | Sung | H01M 50/489 |
| 2021/0074959 A1* | 3/2021 | Khoshkava | H01M 50/136 |

FOREIGN PATENT DOCUMENTS

| | | | |
|---|---|---|---|
| CN | 106953050 A | 7/2017 | |
| CN | 111769239 A | 10/2020 | |
| CN | 111785893 A | 10/2020 | |
| CN | 112582749 A | 3/2021 | |
| WO | 2020142702 A1 | 7/2020 | |

* cited by examiner

Page: # SAFE LITHIUM-ION BATTERY (LIB) SEPARATOR, FABRICATION METHOD THEREOF, AND LIB

CROSS REFERENCE TO THE RELATED APPLICATIONS

This application is the national phase entry of International Application No. PCT/CN2021/099441, filed on Jun. 10, 2021, which is based upon and claims priority to Chinese Patent Application No. 202011463207.4, filed on Dec. 11, 2020, the entire contents of which are incorporated herein by reference.

TECHNICAL FIELD

The present disclosure relates to the technical field of lithium-ion batteries (LIBs), and particularly to a safe LIB separator, a fabrication method thereof, and an LIB.

BACKGROUND

LIBs are widely used in various electronic products due to their large specific energy and long cycle life. However, when the usage amount of LIBs increases, the shortcomings of LIBs have gradually emerged. In recent years, battery fire accidents have often been reported, causing huge damage to people's lives and property.

Therefore, there are generally two reasons why LIBs generate a large amount of heat or even explode during use: 1. Lithium dendrites generated on positive and negative electrodes pierce a separator and thus cause an internal short circuit. 2. When a battery is used improperly, a reaction inside the battery cannot be blocked in time, resulting in a continuous reaction and generating dangerous consequences.

SUMMARY

In order to overcome the deficiencies of the prior art, the present disclosure provides a safe LIB separator, a fabrication method thereof, and an LIB, which can block a reaction of an electrolyte when a temperature rises, such as to play the role of protecting batteries.

The present disclosure adopts the following technical solutions to solve the technical problem: In an aspect, a fabrication method of a safe LIB separator is provided, including the following steps:

S1: preparation of a water-based slurry: mixing a ceramic material, magnesium oxide, conductive carbon black (CB), and a water-based adhesive, and thoroughly stirring, to obtain the water-based slurry;

S2: fabrication of a first film: adding 50 to 60 parts of trans-1,4-polyisoprene, 20 to 30 parts of cis-polybutadiene rubber (cis-BR), 5 to 10 parts of conductive CB, and 5 to 10 parts of water-soluble salt to a compounding granulator for compounding to obtain a memory material with a particle size of 10 nm to 20 nm;

adding the memory material to a mixed solution of aluminum nitride and ethanol, stirring, and subjecting a resulting mixture to suction filtration; and drying a filter cake, and subjecting the filter cake to calcination under the protection of an inert gas to obtain an aluminum nitride-coated solid material;

mixing a high-polymer particle with the solid material, adding a resulting mixed material to a film-blowing machine, blowing the mixed material of the high-polymer particle and the solid material into a film by a film-blowing method, and watering and drying the film to obtain the first film;

S3: fabrication of a second film: melting a mixture of a halogen-containing compound and a water-soluble salt, conducting blow-molding to obtain a film, and watering and drying the film to obtain the second film; and S4: fabrication of the LIB separator: coating the water-based slurry on the first film to form a water-based slurry layer on a surface of the first film, such as to obtain a first composite film; and coating the water-based slurry on the second film to form a water-based slurry layer on a surface of the second film, such as to obtain a second composite film; and drying the first composite film and the second composite film, and compounding the water-based slurry layer on the first composite film with the water-based slurry layer on the second composite film to obtain the LIB separator.

Further, in S1, the ceramic material may be a β-spodumene powder, and there may be 30 to 40 parts of β-spodumene powder, 20 to 35 parts of magnesium oxide, 5 to 10 parts of conductive CB, and 25 to 45 parts of water-based adhesive.

Further, the water-based adhesive may be a polyvinyl alcohol (PVA) waterborne adhesive or a waterborne polyurethane (WPU); and the water-based slurry may have a viscosity range of 500 to 1,000 cps/25° C.

Further, in S2, the compounding may be conducted at 100° C. to 130° C. for 30 min to 60 min; the filter cake may be dried at 80° C. to 100° C. and subjected to calcination at 300° C. to 400° C.; and the memory material may have a phase transition temperature of 50° C. to 80° C.

Further, in S2 and S3, after the film is watered, the film may be dried at 50° C. to 60° C. for 10 min to 20 min.

Further, in S2, the high-polymer particle may be polypropylene (PP) or polyethylene terephthalate (PET).

Further, in S2, the aluminum nitride and the ethanol may be mixed to form a turbid solution, and the aluminum nitride, the ethanol, and the memory material may have a weight ratio of 3:6:1.

Further, in S4, the first composite film and the second composite film may be dried at 50° C. to 100° C. for 1 hour to 2 hours.

Further, in S4, the water-based slurry layer of the first composite film and the water-based slurry layer of the second composite film each may have a thickness of 250 nm to 500 nm.

In another aspect, the present disclosure also provides a safe LIB separator, including a first film, a second film, and a water-based slurry layer, where the first film is attached to the second film through the water-based slurry layer;

a plurality of solid materials are embedded inside the first film; for each of the solid materials, an aluminum nitride shell is arranged outside, and a memory material is arranged inside the aluminum nitride shell; holes are formed on the memory material, and first through-holes communicating with the holes on the memory material are formed on the first film; and second through-holes penetrate through the second film.

In the above structure, the memory material may be prepared by subjecting 50 to 60 parts of trans-1,4-polyisoprene, 20 to 30 parts of cis-BR, 5 to 10 parts of conductive CB, and 5 to 10 parts of water-soluble salt to compounding in a compounding granulator; and the memory material may have a particle size of 10 nm to 20 nm.

In the above structure, the solid material may be prepared as follows: adding the memory material to a mixed solution of aluminum nitride and ethanol, stirring, and subjecting a resulting mixture to suction filtration; and drying a filter cake, and subjecting the filter cake to calcination under the protection of an inert gas.

In the above structure, the water-based slurry layer may be prepared by mixing and stirring 30 to 40 parts of β-spodumene powder, 20 to 35 parts of magnesium oxide, 5 to 10 parts of conductive CB, and 25 to 45 parts of water-based adhesive.

In another aspect, the present disclosure also provides an LIB, where a separator of the LIB is fabricated by the fabrication method of a safe LIB separator described above.

The present disclosure has the following beneficial effects: The first film is covered with spherical particles (namely, a solid material), first through-holes communicating with the spherical particles are formed on the first film, and holes are formed in the memory material in the solid material. When a temperature rises, the holes on the memory material can automatically close to block the further reaction of an electrolyte, thereby playing the role of protecting batteries; and when the temperature falls, the holes open. When the temperature reaches a specified value, the holes of the separator automatically close to block the further reaction of a lithium-ion electrolyte, thereby improving the safety of LIB usage.

DETAILED DESCRIPTION OF THE EMBODIMENTS

The present disclosure is further described below with reference to the accompanying drawings and examples.

In order to make the objectives, features, and effects of the present disclosure fully understood, the concepts, specific structures, and technical effects of the present disclosure will be clearly and completely described below in conjunction with the examples and accompanying drawings. Apparently, the described examples are merely some rather than all of the examples of the present disclosure. All other examples obtained by those skilled in the art based on the examples of the present disclosure without creative efforts should fall within the protection scope of the present disclosure. In addition, all the coupling/connection relations involved in the present disclosure do not only refer to the direct connection of the components, but refer to the fact that a better connection structure can be formed by adding or reducing connection accessories according to specific implementation conditions. The various technical features created by the present disclosure can be combined interactively under the premise of not conflicting with each other.

Example 1

Figure 1:
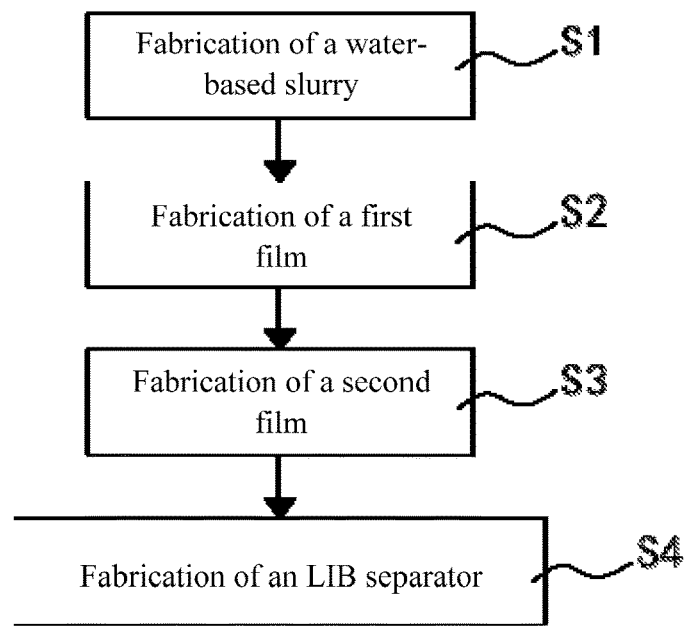
FIG. 1 is a schematic flowchart of the fabrication method of a safe LIB separator according to the present disclosure.

As shown in FIG. 1, the present disclosure discloses a fabrication method of a safe LIB separator. Specifically, the fabrication method includes the following steps:

S1: Preparation of a water-based slurry: a ceramic material, magnesium oxide, conductive CB, and a water-based adhesive were mixed and thoroughly stirred to obtain the water-based slurry.

In this example, the ceramic material was a β-spodumene powder, and there were 30 parts of β-spodumene powder, 20 parts of magnesium oxide, 5 parts of conductive CB, and 25 parts of water-based adhesive; the water-based adhesive was a PVA waterborne adhesive, with water as a solvent; and the obtained water-based slurry had a viscosity range of 500 to 1,000 cps/25° C.

S2: Fabrication of a first film: 50 parts of trans-1,4-polyisoprene, 20 parts of cis-BR, 5 parts of conductive CB, and 5 parts of water-soluble salt were subjected to compounding at 100° C. for 60 min in a compounding granulator to obtain a memory material with a particle size of 10 nm to 20 nm, which had a phase transition temperature of 60° C., where a memory material prepared by such a process generally has a phase transition temperature of 50° C. to 80° C.; then the memory material was added to a mixed solution of aluminum nitride and ethanol, a resulting mixture was stirred and subjected to suction filtration, and a resulting filter cake was dried at 80° C. and then subjected to calcination at 300° C. under the protection of an inert gas to obtain an aluminum nitride-coated solid material, where the aluminum nitride was mixed with ethanol to form a turbid solution, and the aluminum nitride, the ethanol, and the memory material had a weight ratio of 3:6:1; and a high-polymer particle was mixed with the solid material, a resulting mixed material was added to a film-blowing machine, the mixed material of the high-polymer particle and the solid material was blown into a film by a film-blowing method, and the film was watered and dried to obtain the first film, where after the film was watered, the film was dried at 50° C. for 20 min; and the high-polymer particle was PP.

In S2, when the film was watered, the water-soluble salt in the memory material dissolved in water to form holes in the memory material. Since the phase transition temperature of the memory material is generally 50° C. to 80° C., when a temperature rises to this range, the memory material will deform to some extent to close the holes inside the memory material; and when the temperature falls, the memory material will return to its original state. Therefore, when a temperature of a battery is too high due to improper use of the battery or other reasons, the memory material will automatically seal the separator, thereby blocking the lithium-ion exchange between positive and negative electrodes to achieve the purpose of blocking a reaction; and when the temperature reaches a normal level, the shape memory material will automatically recover, such that the LIB can be used normally.

S3: Fabrication of a second film: A mixture of a halogen-containing compound and a water-soluble salt was melted and subjected to blow-molding to form a film, and then the film was watered and dried to obtain the second film. In this step, after the film was watered, the film was dried at 50° C. for 20 min; and after the film was watered, the water-soluble salt was dissolved to form fine through-holes on the second film.

Figure 2:
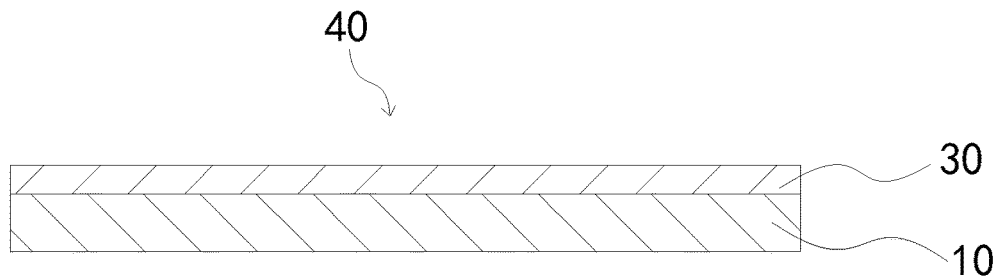
FIG. 2 is a schematic cross-sectional view of the first composite film in the safe LIB separator according to the present disclosure.
Figure 3:
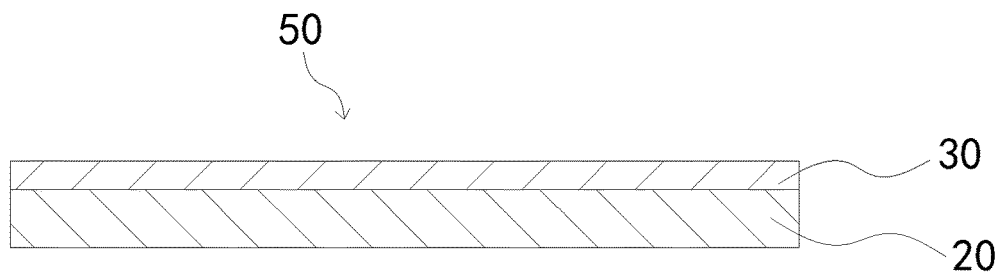
FIG. 3 is a schematic cross-sectional view of the second composite film in the safe LIB separator according to the present disclosure.
Figure 4:
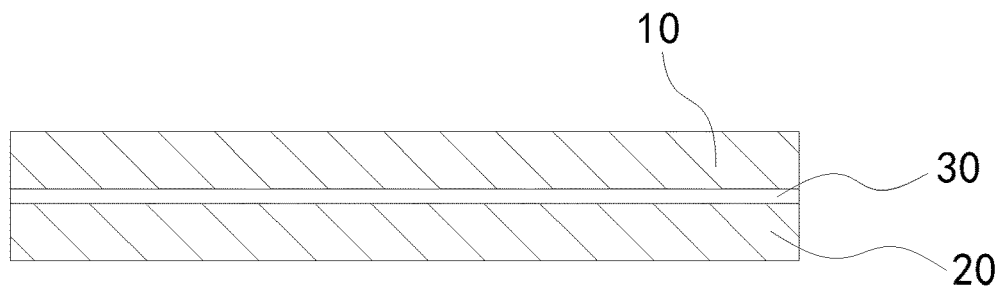
FIG. 4 is a schematic sectional view of the safe LIB separator according to the present disclosure.

S4: Fabrication of the LIB separator: the water-based slurry was coated on the first film 10 to form a water-based slurry layer 30 on a surface of the first film 10, such as to obtain a first composite film 40, a structure of which is shown in FIG. 2; the water-based slurry was coated on the second film 20 to form a water-based slurry layer 30 on a surface of the second film 20, such as to obtain a second composite film 50, a structure of which is shown in FIG. 3; where the water-based slurry layer 30 of the first composite film 40 and the water-based slurry layer 30 of the second composite film 50 each had a thickness of 250 nm; and the first composite film 40 and the second composite film 50 were dried, and the water-based slurry layer 30 on the first composite film 40 was compounded with the water-based slurry layer 30 on the second composite film 50 to obtain the LIB separator, a structure of which is shown in FIG. 4. In this step, the first composite film 40 and the second composite film 50 were dried at 50° C. for 2 hours.

Figure 5:
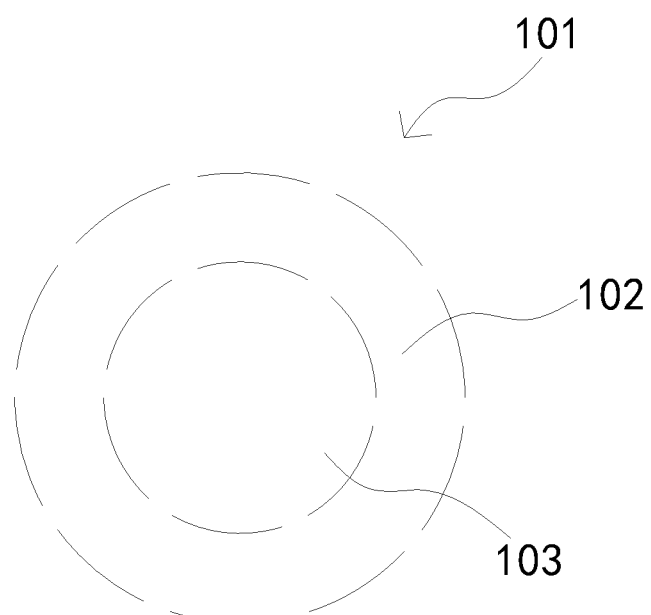
FIG. 5 is a schematic structural diagram of the solid material in the safe LIB separator according to the present disclosure.

As shown in FIG. 4 and FIG. 5, the present disclosure also provides a safe LIB separator, including a first film 10, a second film 20, and a water-based slurry layer 30. The first film 10 is attached to the second film 20 through the water-based slurry layer 30. As shown in FIG. 5, a plurality of solid materials 101 are embedded inside the first film 10, and for each of the solid materials 101, an aluminum nitride shell 102 is arranged outside, and a memory material 103 is arranged inside the aluminum nitride shell 102; holes are formed on the memory material 103, and first through-holes communicating with the holes on the memory material 103 are formed on the first film 10; and second through-holes penetrate through the second film 20.

In this example, the memory material 103 was prepared as follows: 50 parts of trans-1,4-polyisoprene, 20 parts of cis-BR, 5 parts of conductive CB, and 5 parts of water-soluble salt were subjected to compounding in a compounding granulator; and the memory material 103 had a particle size of 10 nm to 20 nm. Further, the solid material 101 was prepared as follows: the memory material 103 was added to a mixed solution of aluminum nitride and ethanol, a resulting mixture was stirred and subjected to suction filtration, and a filter cake was dried and then subjected to calcination under the protection of an inert gas. In this example, the water-based slurry layer 30 was prepared as follows: 30 parts of β-spodumene powder, 20 parts of magnesium oxide, 5 parts of conductive CB, and 25 parts of water-based adhesive were mixed and stirred. The β-spodumene powder in the water-based slurry layer 30 is a ceramic material, which increases a strength of a separator and avoids the risk of short circuit caused when lithium dendrites generated on positive and negative electrodes pierce a separator.

Based on this, in the safe LIB separator of the present disclosure, the first film 10 is covered with spherical particles (namely, a solid material 101), first through-holes communicating with the spherical particles are formed on the first film 10, and holes are formed in the memory material 103 in the solid material 101. When a temperature rises, the holes on the memory material 103 can automatically close to block the further reaction of an electrolyte, thereby playing the role of protecting batteries; and when the temperature falls, the holes open. When the temperature reaches a specified value, the holes of the separator automatically close to block the further reaction of a lithium-ion electrolyte and prevent lithium dendrites on positive and negative electrode sheets from piercing a separator to cause a short circuit.

In addition, the present disclosure also provides an LIB, where a separator of the LIB is fabricated by the fabrication method of a safe LIB separator described above.

Example 2

As shown in FIG. 1, the present disclosure discloses a fabrication method of a safe LIB separator. Specifically, the fabrication method includes the following steps:

S1: Preparation of a water-based slurry: a ceramic material, magnesium oxide, conductive CB, and a water-based adhesive were mixed and thoroughly stirred to obtain the water-based slurry.

In this example, the ceramic material was a β-spodumene powder, and there were 40 parts of β-spodumene powder, 35 parts of magnesium oxide, 10 parts of conductive CB, and 45 parts of water-based adhesive; the water-based adhesive was WPU, with water as a solvent; and the obtained water-based slurry had a viscosity range of 500 to 1,000 cps/25° C.

S2: Fabrication of a first film: 60 parts of trans-1,4-polyisoprene, 30 parts of cis-BR, 10 parts of conductive CB, and 10 parts of water-soluble salt were subjected to compounding at 130° C. for 30 min in a compounding granulator to obtain a memory material with a particle size of 10 nm to 20 nm, which had a phase transition temperature of 51° C., where a memory material prepared by such a process generally has a phase transition temperature of 50° C. to 80° C.; then the memory material was added to a mixed solution of aluminum nitride and ethanol, a resulting mixture was stirred and subjected to suction filtration, and a resulting filter cake was dried at 100° C. and then subjected to calcination at 400° C. under the protection of an inert gas to obtain an aluminum nitride-coated solid material, where the aluminum nitride was mixed with ethanol to form a turbid solution, and the aluminum nitride, the ethanol, and the memory material had a weight ratio of 3:6:1; and a high-polymer particle was mixed with the solid material, a resulting mixed material was added to a film-blowing machine, the mixed material of the high-polymer particle and the solid material was blown into a film by a film-blowing method, and the film was watered and dried to obtain the first film, where after the film was watered, the film was dried at 60° C. for 10 min; and the high-polymer particle was PET.

In S2, when the film was watered, the water-soluble salt in the memory material dissolved in water to form holes in the memory material. Since the phase transition temperature of the memory material is generally 50° C. to 80° C., when a temperature rises to this range, the memory material will deform to some extent to close the holes inside the memory material; and when the temperature falls, the memory material will return to its original state. Therefore, when a temperature of a battery is too high due to improper use of the battery or other reasons, the memory material will automatically seal the separator, thereby blocking the lithium-ion exchange between positive and negative electrodes to achieve the purpose of blocking a reaction; and when the temperature reaches a normal level, the shape memory material will automatically recover, such that the LIB can be used normally.

S3: Fabrication of a second film: A mixture of a halogen-containing compound and a water-soluble salt was melted and subjected to blow-molding to form a film, and then the film was watered and dried to obtain the second film. In this step, after the film was watered, the film was dried at 60° C. for 10 min.

S4: Fabrication of the LIB separator: the water-based slurry was coated on the first film 10 to form a water-based slurry layer 30 on a surface of the first film 10, such as to obtain a first composite film 40, a structure of which is shown in FIG. 2; the water-based slurry was coated on the second film 20 to form a water-based slurry layer 30 on a surface of the second film 20, such as to obtain a second composite film 50, a structure of which is shown in FIG. 3; where the water-based slurry layer 30 of the first composite film 40 and the water-based slurry layer 30 of the second composite film 50 each had a thickness of 500 nm; and the first composite film 40 and the second composite film 50 were dried, and the water-based slurry layer 30 on the first composite film 40 was compounded with the water-based slurry layer 30 on the second composite film 50 to obtain the LIB separator, a structure of which is shown in FIG. 4. In this step, the first composite film 40 and the second composite film 50 were dried at 100° C. for 1 hour.

As shown in FIG. 4 and FIG. 5, the present disclosure also provides a safe LIB separator, including a first film 10, a second film 20, and a water-based slurry layer 30. The first film 10 is attached to the second film 20 through the water-based slurry layer 30. As shown in FIG. 5, a plurality of solid materials 101 are embedded inside the first film 10, and for each of the solid materials 101, an aluminum nitride shell 102 is arranged outside, and a memory material 103 is arranged inside the aluminum nitride shell 102; holes are formed on the memory material 103, and first through-holes communicating with the holes on the memory material 103 are formed on the first film 10; and second through-holes penetrate through the second film 20.

In this example, the memory material 103 was prepared as follows: 60 parts of trans-1,4-polyisoprene, 30 parts of cis-BR, 10 parts of conductive CB, and 10 parts of water-soluble salt were subjected to compounding in a compounding granulator; and the memory material 103 had a particle size of 10 nm to 20 nm. Further, the solid material 101 was prepared as follows: the memory material 103 was added to a mixed solution of aluminum nitride and ethanol, a resulting mixture was stirred and subjected to suction filtration, and a filter cake was dried and then subjected to calcination under the protection of an inert gas. In this example, the water-based slurry layer 30 was prepared as follows: 40 parts of β-spodumene powder, 35 parts of magnesium oxide, 10 parts of conductive CB, and 45 parts of water-based adhesive were mixed and stirred. The β-spodumene powder in the water-based slurry layer 30 is a ceramic material, which increases a strength of a separator and avoids the risk of short circuit caused when lithium dendrites generated on positive and negative electrodes pierce a separator.

Based on this, in the safe LIB separator of the present disclosure, the first film 10 is covered with spherical particles (namely, a solid material 101), first through-holes communicating with the spherical particles are formed on the first film 10, and holes are formed in the memory material 103 in the solid material 101. When a temperature rises, the holes on the memory material 103 can automatically close to block the further reaction of an electrolyte, thereby playing the role of protecting batteries; and when the temperature falls, the holes open. When a temperature reaches a specified value, the holes of the separator automatically close to block the further reaction of a lithium-ion electrolyte and prevent lithium dendrites on positive and negative electrode sheets from piercing a separator to cause a short circuit.

In addition, the present disclosure also provides an LIB, where a separator of the LIB is fabricated by the fabrication method of a safe LIB separator described above.

Example 3

As shown in FIG. 1, the present disclosure discloses a fabrication method of a safe LIB separator. Specifically, the fabrication method includes the following steps:

S1: Preparation of a water-based slurry: a ceramic material, magnesium oxide, conductive CB, and a water-based adhesive were mixed and thoroughly stirred to obtain the water-based slurry.

In this example, the ceramic material was a β-spodumene powder, and there were 35 parts of β-spodumene powder, 30 parts of magnesium oxide, 7 parts of conductive CB, and 35 parts of water-based adhesive; the water-based adhesive was a PVA waterborne adhesive, with water as a solvent; and the obtained water-based slurry had a viscosity range of 500 to 1,000 cps/25° C.

S2: Fabrication of a first film: 55 parts of trans-1,4-polyisoprene, 25 parts of cis-BR, 7 parts of conductive CB, and 7 parts of water-soluble salt were subjected to compounding at 120° C. for 45 min in a compounding granulator to obtain a memory material with a particle size of 10 nm to 20 nm, which had a phase transition temperature of 70° C., where a memory material prepared by such a process generally has a phase transition temperature of 50° C. to 80° C.; then the memory material was added to a mixed solution of aluminum nitride and ethanol, a resulting mixture was stirred and subjected to suction filtration, and a resulting filter cake was dried at 90° C. and then subjected to calcination at 350° C. under the protection of an inert gas to obtain an aluminum nitride-coated solid material, where the aluminum nitride was mixed with ethanol to form a turbid solution, and the aluminum nitride, the ethanol, and the memory material had a weight ratio of 3:6:1; and a high-polymer particle was mixed with the solid material, a resulting mixed material was added to a film-blowing machine, the mixed material of the high-polymer particle and the solid material was blown into a film by a film-blowing method, and the film was watered and dried to obtain the first film, where after the film was watered, the film was dried at 55° C. for 30 min; and the high-polymer particle was PP.

In S2, when the film was watered, the water-soluble salt in the memory material dissolved in water to form holes in the memory material. Since the phase transition temperature of the memory material is generally 50° C. to 80° C., when a temperature rises to this range, the memory material will deform to some extent to close the holes inside the memory material; and when the temperature falls, the memory material will return to its original state. Therefore, when a temperature of a battery is too high due to improper use of the battery or other reasons, the memory material will automatically seal the separator, thereby blocking the lithium-ion exchange between positive and negative electrodes to achieve the purpose of blocking a reaction; and when the temperature reaches a normal level, the shape memory material will automatically recover, such that the LIB can be used normally.

S3: Fabrication of a second film: A mixture of a halogen-containing compound and a water-soluble salt was melted and subjected to blow-molding to form a film, and then the film was watered and dried to obtain the second film. In this step, after the film was watered, the film was dried at 55° C. for 15 min.

S4: Fabrication of the LIB separator: the water-based slurry was coated on the first film 10 to form a water-based slurry layer 30 on a surface of the first film 10, such as to obtain a first composite film 40, a structure of which is shown in FIG. 2; the water-based slurry was coated on the second film 20 to form a water-based slurry layer 30 on a surface of the second film 20, such as to obtain a second composite film 50, a structure of which is shown in FIG. 3; where the water-based slurry layer 30 of the first composite film 40 and the water-based slurry layer 30 of the second composite film 50 each had a thickness of 375 nm; and the first composite film 40 and the second composite film 50 were dried, and the water-based slurry layer 30 on the first composite film 40 was compounded with the water-based slurry layer 30 on the second composite film 50 to obtain the LIB separator, a structure of which is shown in FIG. 4. In this step, the first composite film 40 and the second composite film 50 were dried at 75° C. for 1.5 hours.

As shown in FIG. 4 and FIG. 5, the present disclosure also provides a safe LIB separator, including a first film 10, a second film 20, and a water-based slurry layer 30. The first film 10 is attached to the second film 20 through the water-based slurry layer 30. As shown in FIG. 5, a plurality of solid materials 101 are embedded inside the first film 10, and for each of the solid materials 101, an aluminum nitride shell 102 is arranged outside, and a memory material 103 is arranged inside the aluminum nitride shell 102; holes are formed on the memory material 103, and first through-holes communicating with the holes on the memory material 103 are formed on the first film 10; and second through-holes penetrate through the second film 20.

In this example, the memory material 103 was prepared as follows: 55 parts of trans-1,4-polyisoprene, 25 parts of cis-BR, 7 parts of conductive CB, and 7 parts of water-soluble salt were subjected to compounding in a compounding granulator; and the memory material 103 had a particle size of 10 nm to 20 nm. Further, the solid material 101 was prepared as follows: the memory material 103 was added to a mixed solution of aluminum nitride and ethanol, a resulting mixture was stirred and subjected to suction filtration, and a filter cake was dried and then subjected to calcination under the protection of an inert gas. In this example, the water-based slurry layer 30 was prepared as follows: 35 parts of β-spodumene powder, 30 parts of magnesium oxide, 7 parts of conductive CB, and 35 parts of water-based adhesive were mixed and stirred. The β-spodumene powder in the water-based slurry layer 30 is a ceramic material, which increases a strength of a separator, avoids the risk of short circuit caused when lithium dendrites generated on positive and negative electrodes pierce a separator, and does not affect the free passage of lithium ions through a thin water-based slurry layer.

Based on this, in the safe LIB separator of the present disclosure, the first film 10 is covered with spherical particles (namely, a solid material 101), first through-holes communicating with the spherical particles are formed on the first film 10, and holes are formed in the memory material 103 in the solid material 101. When a temperature rises, the holes on the memory material 103 can automatically close to block the further reaction of an electrolyte, thereby playing the role of protecting batteries; and when the temperature falls, the holes open. When a temperature reaches a specified value, the holes of the separator automatically close to block the further reaction of a lithium-ion electrolyte and prevent lithium dendrites on positive and negative electrode sheets from piercing a separator to cause a short circuit.

In addition, the present disclosure also provides an LIB, where a separator of the LIB is fabricated by the fabrication method of a safe LIB separator described above.

Example 4

As shown in FIG. 1, the present disclosure discloses a fabrication method of a safe LIB separator. Specifically, the fabrication method includes the following steps:

S1: Preparation of a water-based slurry: a ceramic material, magnesium oxide, conductive CB, and a water-based adhesive were mixed and thoroughly stirred to obtain the water-based slurry.

In this example, the ceramic material was a β-spodumene powder, and there were 32 parts of β-spodumene powder, 35 parts of magnesium oxide, 10 parts of conductive CB, and 30 parts of water-based adhesive; the water-based adhesive was WPU, with water as a solvent; and the obtained water-based slurry had a viscosity range of 500 to 1,000 cps/25° C.

S2: Fabrication of a first film: 58 parts of trans-1,4-polyisoprene, 28 parts of cis-BR, 10 parts of conductive CB, and 10 parts of water-soluble salt were subjected to compounding at 130° C. for 30 min in a compounding granulator to obtain a memory material with a particle size of 10 nm to 20 nm, which had a phase transition temperature of 53° C., where a memory material prepared by such a process generally has a phase transition temperature of 50° C. to 80° C.; then the memory material was added to a mixed solution of aluminum nitride and ethanol, a resulting mixture was stirred and subjected to suction filtration, and a resulting filter cake was dried at 100° C. and then subjected to calcination at 400° C. under the protection of an inert gas to obtain an aluminum nitride-coated solid material, where the aluminum nitride was mixed with ethanol to form a turbid solution, and the aluminum nitride, the ethanol, and the memory material had a weight ratio of 3:6:1; and a high-polymer particle was mixed with the solid material, a resulting mixed material was added to a film-blowing machine, the mixed material of the high-polymer particle and the solid material was blown into a film by a film-blowing method, and the film was watered and dried to obtain the first film, where after the film was watered, the film was dried at 60° C. for 10 min; and the high-polymer particle was PET.

In S2, when the film was watered, the water-soluble salt in the memory material dissolved in water to form holes in the memory material. Since the phase transition temperature of the memory material is generally 50° C. to 80° C., when a temperature rises to this range, the memory material will deform to some extent to close the holes inside the memory material; and when the temperature falls, the memory material will return to its original state. Therefore, when a temperature of a battery is too high due to improper use of the battery or other reasons, the memory material will automatically seal the separator, thereby blocking the lithium-ion exchange between positive and negative electrodes to achieve the purpose of blocking a reaction; and when the temperature reaches a normal level, the shape memory material will automatically recover, such that the LIB can be used normally.

S3: Fabrication of a second film: A mixture of a halogen-containing compound and a water-soluble salt was melted and subjected to blow-molding to form a film, and then the film was watered and dried to obtain the second film. In this step, after the film was watered, the film was dried at 60° C. for 10 min.

S4: Fabrication of the LIB separator: the water-based slurry was coated on the first film 10 to form a water-based slurry layer 30 on a surface of the first film 10, such as to obtain a first composite film 40, a structure of which is shown in FIG. 2; the water-based slurry was coated on the second film 20 to form a water-based slurry layer 30 on a surface of the second film 20, such as to obtain a second composite film 50, a structure of which is shown in FIG. 3; where the water-based slurry layer 30 of the first composite film 40 and the water-based slurry layer 30 of the second composite film 50 each had a thickness of 500 nm; and the first composite film 40 and the second composite film 50 were dried, and the water-based slurry layer 30 on the first composite film 40 was compounded with the water-based slurry layer 30 on the second composite film 50 to obtain the LIB separator, a structure of which is shown in FIG. 4. In this step, the first composite film 40 and the second composite film 50 were dried at 100° C. for 1 hour.

As shown in FIG. 4 and FIG. 5, the present disclosure also provides a safe LIB separator, including a first film 10, a second film 20, and a water-based slurry layer 30. The first film 10 is attached to the second film 20 through the water-based slurry layer 30. As shown in FIG. 5, a plurality of solid materials 101 are embedded inside the first film 10, and for each of the solid materials 101, an aluminum nitride shell 102 is arranged outside, and a memory material 103 is arranged inside the aluminum nitride shell 102; holes are formed on the memory material 103, and first through-holes communicating with the holes on the memory material 103 are formed on the first film 10; and second through-holes penetrate through the second film 20.

In this example, the memory material 103 was prepared as follows: 58 parts of trans-1,4-polyisoprene, 28 parts of cis-BR, 10 parts of conductive CB, and 10 parts of water-soluble salt were subjected to compounding in a compounding granulator; and the memory material 103 had a particle size of 10 nm to 20 nm. Further, the solid material 101 was prepared as follows: the memory material 103 was added to a mixed solution of aluminum nitride and ethanol, a resulting mixture was stirred and subjected to suction filtration, and a filter cake was dried and then subjected to calcination under the protection of an inert gas. In this example, the water-based slurry layer 30 was prepared as follows: 32 parts of β-spodumene powder, 35 parts of magnesium oxide, 10 parts of conductive CB, and 30 parts of water-based adhesive were mixed and stirred. The β-spodumene powder in the water-based slurry layer 30 is a ceramic material, which increases a strength of a separator and avoids the risk of short circuit caused when lithium dendrites generated on positive and negative electrodes pierce a separator.

Based on this, in the safe LIB separator of the present disclosure, the first film 10 is covered with spherical particles (namely, a solid material 101), first through-holes communicating with the spherical particles are formed on the first film 10, and holes are formed in the memory material 103 in the solid material 101. When a temperature rises, the holes on the memory material 103 can automatically close to block the further reaction of an electrolyte, thereby playing the role of protecting batteries; and when the temperature falls, the holes open. When a temperature reaches a specified value, the holes of the separator automatically close to block the further reaction of a lithium-ion electrolyte and prevent lithium dendrites on positive and negative electrode sheets from piercing a separator to cause a short circuit.

In addition, in combination with the above Examples 1 to 4, the safe LIB separators fabricated by the present disclosure are compared with a separator purchased in the prior art.

Comparative example separator: a commercially-available common separator is adopted, which has a porosity of 85% and a pore size of 50%, and is a PP membrane.

Example separator: the LIB separators provided in Examples 1 to 4 are adopted.

Fabrication of LIB with the comparative example separator: Graphite, polyvinylidene fluoride (PVDF), and n-butyl acetate were mixed in a ratio of 2:1:2 to obtain a negative electrode active slurry, and the negative electrode active slurry was coated on a conductive film plated with copper to obtain a negative electrode sheet, where the conductive film had a thickness of 3 μm, and two sides thereof each were plated with a copper layer of a thickness of 1 μm; lithium iron phosphate (LFP), PVDF, and ethyl acetate were mixed in a ratio of 5:2:3 to prepare a positive electrode active material, and the positive electrode active material was coated on a film plated with aluminum to obtain a positive electrode sheet, where the film had a thickness of 3 μm, and two sides thereof each were plated with an aluminum layer of a thickness of 1 μm; a polyethylene (PE) membrane with a porosity of 85% and a pore size of 50 nm was used as a separator; an EC+DMC+EMC solution of 1.0 M LiPF6 was adopted as an electrolyte; and all the components were assembled in a glove box.

Fabrication of LIB with the example separator: A fabrication process was the same as that of the comparative example, except that the separator used was the separator provided by the present disclosure.

Overcharge test: The batteries obtained in the examples and comparative example were charged to 5 V at a constant current and a rate of 3 C, and a battery state was recorded. Experimental results are shown as follows:

| Sample | 3 C to 5 C overcharge test |
| --- | --- |
| Comparative Example 1 | Smoke |
| Comparative Example 2 | Smoke |
| Comparative Example 3 | Fire |
| Comparative Example 4 | Smoke |
| Example 1 | There is no phenomena such as fire and smoke. |
| Example 2 | There is no phenomena such as fire and smoke. |
| Example 3 | There is no phenomena such as fire and smoke. |
| Example 4 | There is no phenomena such as fire and smoke. |

In addition, the present disclosure also provides an LIB, where a separator of the LIB is fabricated by the fabrication method of a safe LIB separator described above.

The preferred examples of the present disclosure have been described in detail above, but the present disclosure is not limited to the examples. Those skilled in the art may make various equivalent modifications or substitutions without departing from the spirit of the present disclosure, and these equivalent modifications or substitutions are all included in the scope defined by the claims of the present disclosure.

The first film is covered with spherical particles, first through-holes communicating with the spherical particles are formed in the first film, and holes are formed in the memory material in the solid material. Thus, when a temperature rises, the holes on the memory material can automatically close to block the further reaction of an electrolyte, thereby playing the role of protecting LIBs; and when the temperature falls, the holes open, which improves the safety of LIB usage. Therefore, the safe LIB separator, the fabrication method thereof, and the LIB of the present disclosure have practicability.

What is claimed is:

1. A fabrication method of a safe lithium-ion battery (LIB) separator, comprising the following steps:
S1: a preparation of a water-based slurry: mixing a ceramic material, magnesium oxide, conductive carbon black (CB), and a water-based adhesive, and thoroughly stirring to obtain the water-based slurry;

S2: a fabrication of a first film: adding 50 to 60 parts of trans-1,4-polyisoprene, 20 to 30 parts of cis-polybutadiene rubber (cis-BR), 5 to 10 parts of conductive CB, and 5 to 10 parts of water-soluble salt to a compounding granulator for compounding to obtain a memory material with a particle size of 10 nm to 20 nm;

adding the memory material to a mixed solution of aluminum nitride and ethanol to obtain a resulting mixture, stirring, and subjecting the resulting mixture of the memory material and the mixed solution to a suction filtration to obtain a filter cake; and drying the filter cake to obtain a dried filter cake, and subjecting the dried filter cake to a calcination under a protection of an inert gas to obtain an aluminum nitride-coated solid material;

mixing a high-polymer particle with the aluminum nitride-coated solid material to obtain a resulting mixed material, adding the resulting mixed material to a film-blowing machine, blowing the resulting mixed material of the high-polymer particle and the aluminum nitride-coated solid material into a first previous film by a film-blowing method, and watering and drying the first previous film to obtain the first film;

S3: a fabrication of a second film: melting a mixture of a halogen-containing compound and a water-soluble salt, conducting a blow-molding on the mixture to obtain a second previous film, and watering and drying the second previous film to obtain the second film; and S4: a fabrication of the LIB separator: coating the water-based slurry on the first film to form a first water-based slurry layer on a surface of the first film, to obtain a first composite film; and coating the water-based slurry on the second film to form a second water-based slurry layer on a surface of the second film, to obtain a second composite film; and drying the first composite film and the second composite film, and compounding the first water-based slurry layer on the first composite film with the second water-based slurry layer on the second composite film to obtain the LIB separator.

2. The fabrication method of the safe LIB separator according to claim 1, wherein in S1, the ceramic material is a β-spodumene powder, and the water-based slurry comprises 30 to 40 parts of the β-spodumene powder, 20 to 35 parts of the magnesium oxide, 5 to 10 parts of the conductive CB, and 25 to 45 parts of the water-based adhesive.

3. The fabrication method of the safe LIB separator according to claim 2, wherein the water-based adhesive is a polyvinyl alcohol (PVA) waterborne adhesive or a waterborne polyurethane (WPU); and the water-based slurry has a viscosity range of 500 to 1,000 cps/25° C.

4. The fabrication method of the safe LIB separator according to claim 1, wherein in S2, the compounding is conducted at 100° C. to 130° C. for 30 min to 60 min; the filter cake is dried at 80° C. to 100° C. and the dried filter cake is subjected to the calcination at 300° C. to 400° C.; and the memory material has a phase transition temperature of 50° C. to 80° C.

5. The fabrication method of the safe LIB separator according to claim 1, wherein in S2 and S3, after the first previous film and the second previous film are watered, the first previous film and the second previous film are dried at 50° C. to 60° C. for 10 min to 20 min.

6. The fabrication method of the safe LIB separator according to claim 1, wherein in S2, the high-polymer particle is a polypropylene (PP) or a polyethylene terephthalate (PET).

7. The fabrication method of the safe LIB separator according to claim 1, wherein in S2, the aluminum nitride and the ethanol are mixed to form a turbid solution, and a weight ratio of the aluminum nitride, the ethanol, and the memory material is 3:6:1.

8. The fabrication method of the safe LIB separator according to claim 1, wherein in S4, the first composite film and the second composite film are dried at 50° C. to 100° C. for 1 hour to 2 hours.

9. The fabrication method of the safe LIB separator according to claim 1, wherein in S4, the first water-based slurry layer of the first composite film and the second water-based slurry layer of the second composite film each have a thickness of 250 nm to 500 nm.

10. An LIB, wherein a separator of the LIB is fabricated by the fabrication method of the safe LIB separator according to claim 1.

11. The LIB according to claim 10, wherein the fabrication method, wherein in S1, the ceramic material is a β-spodumene powder, and the water-based slurry comprises 30 to 40 parts of the β-spodumene powder, 20 to 35 parts of the magnesium oxide, 5 to 10 parts of the conductive CB, and 25 to 45 parts of the water-based adhesive.

12. The LIB according to claim 11, wherein the fabrication method, wherein the water-based adhesive is a polyvinyl alcohol (PVA) waterborne adhesive or a waterborne polyurethane (WPU); and the water-based slurry has a viscosity range of 500 to 1,000 cps/25° C.

13. The LIB according to claim 10, wherein the fabrication method, wherein in S2, the compounding is conducted at 100° C. to 130° C. for 30 min to 60 min; the filter cake is dried at 80° C. to 100° C. and the dried filter cake is subjected to the calcination at 300° C. to 400° C.; and the memory material has a phase transition temperature of 50° C. to 80° C.

14. The LIB according to claim 10, wherein the fabrication method, wherein in S2 and S3, after the first previous film and the second previous film are watered, the first previous film and the second previous film are dried at 50° C. to 60° C. for 10 min to 20 min.

15. The LIB according to claim 10, wherein the fabrication method, wherein in S2, the high-polymer particle is a polypropylene (PP) or a polyethylene terephthalate (PET).

16. The LIB according to claim 10, wherein the fabrication method, wherein in S2, the aluminum nitride and the ethanol are mixed to form a turbid solution, and a weight ratio of the aluminum nitride, the ethanol, and the memory material is 3:6:1.

17. A safe lithium-ion battery (LIB) separator, comprising a first film,
a second film, and
a water-based slurry layer, wherein
the first film is attached to the second film through the water-based slurry layer;
a plurality of solid materials are embedded inside the first film; for each of the plurality of solid materials, an aluminum nitride shell is arranged outside, and a memory material is arranged inside the aluminum nitride shell; the memory material is prepared by subjecting 50 to 60 parts of trans-1,4-polyisoprene, 20 to 30 parts of cis-polybutadiene rubber (cis-BR), 5 to 10 parts of conductive carbon black (CB), and 5 to 10 parts of a water-soluble salt to compounding in a compounding granulator;
the memory material has a particle size distribution of 10 nm to 20 nm; and holes are formed on the memory material.

18. The safe LIB separator according to claim 17, wherein the plurality of solid materials are prepared as follows: adding the memory material to a mixed solution of aluminum nitride and ethanol, stirring, and subjecting a resulting mixture of the memory material and the mixed solution to a suction filtration; and drying a filter cake after the suction filtration, and subjecting the filter cake to a calcination under a protection of an inert gas.

19. The safe LIB separator according to claim 17, wherein the water-based slurry layer is prepared by mixing and stirring 30 to 40 parts of β-spodumene powder, 20 to 35 parts of magnesium oxide, 5 to 10 parts of conductive CB, and 25 to 45 parts of water-based adhesive.

\* \* \* \* \*